Patented June 28, 1932

1,864,985

UNITED STATES PATENT OFFICE

JOAQUIN JULIO DE LA ROZA, SR., OF TUINUCU, CUBA

METHOD OF MANUFACTURING CELLULOSE

No Drawing.    Application filed May 1, 1928. Serial No. 274,367.

This invention relates to a method of manufacturing cellulose for all uses to which such material may be put, and has for an object to provide for the production of soft, strong, fibrous material adapted for use in various manufactures, the said material being produced from sugar cane fiber.

Another object consists in providing certain improvements in the manufacture whereby advantageous results are obtained.

In the manufacture of sugar from cane the latter is crushed between rollers or treated in diffusers in well-understood manners and, as a result of either of these operations, there is left the coarse fibrous element of the sugar cane. This substance is produced in very large quantity and, at present, it is commonly used as fuel for firing the power plants of the sugar factories which operate upon the cane. The material is not very suitable as a fuel, largely because of its low calorific value mainly due to its high water content, but the great amount produced calls for its use in such manner in the absence of a more profitable employment of it. My invention contemplates utilizing the fiber of the sugar cane in a much more profitable manner so that it will be economical to fire the factory furnaces with more efficient fuel, such as coal or oil, thereby bettering the manufacturing operations in this respect, in addition to obtaining a very substantial profit from the employment of the fiber according to my invention.

It is my belief that I have devised a method of producing a very pure cellulose high in alpha content, and possessing other very desirable characteristics, in a manner which is commercially economical and practicable and which does not impair the native strength of the fibrous element of the sugar cane, which product, resulting from my invention, is well adapted for the manufacture of paper, paper board, explosives, artificial silk, photographic films, pyroxylin products, cotton substitutes, absorbents, and analogous products.

Previous efforts to utilize sugar cane fiber in the manufacture of cellulose intended to be used, for instance, for paper, cellulose products, or the like, have commonly embodied, in the main, treating the fiber to a more or less drastic digestion with a caustic alkali or other chemicals, without previous treatment or preparation; and I have determined that, when the fiber of sugar cane is subjected to such a digestion treatment, various substances bound in with it, such as complex carbohydrates, and the like, gelatinize, and the resulting product has parchment-like qualities and other properties which are highly undesirable, while the subsequent steps required in the attempt to eliminate the undesirable effects of such gelatinization greatly injure the native properties of the sugar cane fibers, which properties would render them appropriate for such uses as those contemplated for the product of this invention.

Many other efforts to utilize sugar cane fiber in the manufacture of cellulose, which have embodied certain treatment previous to digestion, have failed to conduct such treatment under conditions which are necessary for the attainment of satisfactory results. Treatments such as merely boiling with water or weak alkali, have resulted in either causing or failing to prevent the formation of saccharates and other compounds, and have therefore been unsatisfactory because such compounds are dissolved with great difficulty and efforts to dissolve them tend to injure the cellulose, as by the formation of large amounts of beta and gamma cellulose as well as producing over-hydration and subsequent stiffening of the product. If these treatments previous to digestion comprise the use of a dilute alkaline aqueous solution at elevated temperature and pressure there will be obtained an improvement in color, but the product still tends to the parchment-like character and over-hydration.

The results of these above described previous efforts have been unsatisfactory, especially in that the quality of the products was poor, and this has been attributed mainly to the presence or action of the pith or parenchyma of the sugar cane.

As a matter of fact, the defects in such previous products have not been due to the pith, but have been due to the presence of varying amounts of sucrose and other sugars, pentosans, and similar carbohydrates which, unless removed, changed or transformed before the material is digested in the ordinary course of manufacture of cellulose by the soda and other processes, decompose, change and combine with the alkali base used in such processes, thereby forming complex gelatinous-like masses, almost insoluble, and which are very difficult, if not impossible, to remove by subsequent treatments.

The regular sulphite process for wood digestion or modified forms of it, with varying percentages of free and combined sulphurous acid, which have been proposed from time to time for use in the treatment of sugar cane fiber to produce cellulose, in which the acid sulphite liquor is made by bringing sulphur dioxide gas into contact with calcium or magnesium hydroxide or other base or bases, all tend to form the above mentioned undesirable compounds to a greater or less extent, as they contain more or less base or bases. If the base used is calcium, this effect is more noticeable than if a more easily soluble base is used, such as sodium or magnesium, but the undesirable effect is obtained in either case, and the presence of the said compounds imparts the objectionable properties of parchment-like character or stiffness and an apparent overhydration to the resulting product. This may be due to the formation of insoluble sucrates or similar difficultly soluble substances such, for instance, as calcium sucrate and calcium trisaccharate.

My method, which forms the subject matter of this invention, comprehends subjecting the sugar cane fiber to two main treatments, the first being in a hot dilute aqueous sulphurous acid solution free from any added base, and the second in a hot aqueous alkaline solution.

In the first, or sulphurous acid, treatment the sucrose, invert and other sugars, pentosans and similar carbohydrates, and the like, are removed or transformed so as to nullify their injurious effects; while in the second, or alkaline, treatment the various substances contained in the fibrous material, which remain after the first treatment, are rendered soluble and easy of removal by the subsequent steps of washing, bleaching, etc., usually practiced in the treatment of pulp, thereby resulting in the cellulose product which is the object of this invention.

It should be observed that sugar cane fiber is to be distinguished from wood or similar pulp producing materials, not only because of its sugar content, but because, in the wood, the incrusting matters belong to a group of so-called lignin substances, whereas sugar cane contains certain substances which can be classed as lignin, and others which are called pectic.

The method constituting my present invention is particularly applicable to the treatment of sugar cane fiber because the first, or sulphurous acid, treatment leads to the removal of the sugars and similar carbohydrates as well as the coloring matters, while the second, or alkaline, treatment lends itself to the removal of the pectic substances, especially after the latter have been rendered non-gelatinizable and easily soluble by the first treatment. This involves the expenditure of a greatly decreased amount of chemicals in both treatments, as compared with prior methods above described, and results in a high yield of the desired high quality product.

In carrying out my invention, the first treatment should be effected at such temperature and pressure as will accomplish the desired results above mentioned with a maximum of economy in time, chemicals, and heat, but care should be taken to avoid such high temperature as might substantially damage the cellulose fiber. I find it desirable to avoid exceeding 150° centigrade in the dilute sulphurous acid treatment, and this is particularly to be kept in mind because the absence of a base such as is used in the regular sulphite process increases the tendency to injury of the fiber by high temperature.

It will be understood that the temperature employed will vary with the strength of the sulphurous acid solution. If a moderately dilute solution is employed, the treatment should be at comparatively low temperature without much pressure. If, on the other hand, a very dilute sulphurous acid solution is employed, the temperature of 150° centigrade may be attained in order to effect the desired reaction. Where the process is being carried out in the Tropics, as would be the fact in most cases, the use of even a moderately dilute sulphurous acid solution is difficult commercially and it is practically necessary to employ a quite dilute solution unless artificial refrigeration is available. By preference, I employ sulphurous acid of such concentration that it may be handled commercially throughout the various steps of manufacturing the acid from sulphur and treating the sugar cane fiber, with a minimum of discomfort to the employees, but which is sufficiently strong to bring about the desired reaction without the use of too high temperature or too great pressure.

Generally speaking, treatment with a dilute sulphurous acid solution of about one percent $SO_2$, based on the weight of bone dry sugar cane fiber, without any base, at a temperature of 120° to 130° centigrade, for a period of a few minutes, will suffice.

In carrying out the aqueous alkaline treatment constituting the second step of my invention, I also avoid the employment of too strong a solution in order to eliminate injury to the fiber. Generally speaking, it is satisfactory to employ about eighteen to twenty-five percent of alkali, such as potassium or sodium hydroxide, based on the bone dry weight of the sugar cane fiber, a temperature of 140° to 170° centigrade, and a period of one to two hours.

It will be seen from the foregoing that my method avoids intense acid or alkaline treatment, and also avoids the use of any base in the acid treatment, thereby eliminating the disadvantages hereinabove set forth, as well as others inherent in such intense treatments, and consequently promoting economy and improving the quality of the product. It should be noted that neither my first nor second treatment would, individually, be sufficient to obtain the product desired from sugar cane fiber, and that the first, or dilute sulphurous acid, treatment in the absence of a base effects only partial solution or transformation of the incrusting matters and similar substances contained in the cane, while the second, or alkaline, treatment, which is much less intense in strength of chemical, time and temperature than the usual alkaline processes employed in the treatment of wood, accomplishes the complete reaction which is desired in order to render the remaining substances easily removable from the cellulose by washing and light bleaching.

It may also be noted that sugar cane fiber contains substances which are soluble in alkali but are precipitated by acid, as well as substances which are soluble in acid but are precipitated by alkali. If the cane fiber is treated first with alkali and then with acid, the substances precipitated by the acid treatment are more undesirable than those precipitated by the alkali if the order of the said treatments is reversed. Again, if the cane fiber is treated with alkali and acid simultaneously, as would be the case when an attempt is made to produce cellulose from sugar cane by the sulphite process ordinarily employed in connection with wood, or adaptations of said process involving the use of one or more bases, the sugar cane fiber will not pulp satisfactorily and the desired product will not be obtained.

In following a preferred manner of carrying out my invention, the cane fiber obtained from the crushing rollers or diffusers, which is in excellent condition for this treatment due to its wet condition, is conveyed, by means of blowers or other suitable arrangement, into a vessel which is preferably substantially like the standard sulphite digester. This vessel is preferably composed of ferric material, such as steel or iron, lined with brick adapted to resist the alternate action of dilute acid and dilute alkali. This character of brick is well known to the chemical industry, although it differs sharply from the brick used in the standard sulphite pulp digesters in that the latter are specially designed to withstand acid action only. Such brick may be instanced by the specially burned standard silica brick known to the trade as Semco TX 9X 2 Trad.

The same effect in lining the vessel may be obtained in other ways as, for example, by plating the same with chromium or cadmium. The arrangement of valves, vents, and the like, may differ to a certain extent from the standard arrangement of the sulphite digesters, but such changes are well within the skill of the calling and merely for the purpose of better adapting the apparatus to the specific conditions in hand. It should be stated, however, that the said fittings should be composed of material which is resistant to the chemical reactions involved, or be so treated as to make them resistant thereto.

After the sugar cane fiber has been passed into this vessel the valves, vents, openings, and the like, are closed, and a very dilute solution of sulphurous acid without any base is added. I prefer to use hot solution if it can be economically obtained and, indeed, the hotter the solution is the more the processes will be expedited. After the vessel has been substantially filled with this solution, steam is injected and the contents heated quite rapidly to the desired temperature, which is maintained for the period selected. It has already been noted that there may be variations in strength of acid solution, temperature and period of time, and it should be said that the maintenance of proper relationship between these factors in case of change in one or more is within the skill of those versed in this art. The operator must, however, keep in mind the fact that the absence of a base in this dilute sulphurous acid treatment tends to promote injury to the fiber if an excessively high temperature is adopted.

When the first, or dilute sulphurous acid, treatment has proceeded for the intended period of time, the liquor is allowed to drain through the perforated bottom drainer of the vessel, after which the same is closed and an alkaline solution of the desired concentration is run into the vessel in the intended amount. Then steam is injected until a suitable temperature is obtained, and the charge maintained at the said temperature for the predetermined period of time.

The charge is then blown into a pit or other container and thereafter washed in a suitable manner with water, bleached, and otherwise finally treated, all as well understood in this art. It will be found that the amount of bleach required is unusually low and the product of unusually high purity and alpha cellulose content.

While I have described the process as being effected by carrying out both treatments in one vessel, it will be understood that two vessels can be employed, one for the dilute sulphurous acid treatment and the other for the alkali treatment, the charge being transferred from the first vessel to the second vessel in any approved manner intermediate the treatments. Also, if a moderately dilute sulphurous acid solution is used, the treatment may be conducted in a vessel of concrete lined with acid resisting tile or similar material, at atmospheric pressure; after which the charge may be removed to a lined digester, such as hereinabove mentioned, and submitted to the second, or alkaline, treatment.

Though I have mentioned treating sugar cane fiber resulting from cane which has been put through the usual processes for extracting the sugar, it is a feature of this invention that I may utilize fiber obtained from sugar cane which has been damaged with respect to its adaptability for the manufacture of sugar as, for instance, by fires in the field. Such damaged sugar cane, even though it may be unsuitable for the production of sugar, is well adapted for treatment by my above described method whereby the uninjured fibers can be separated and the intended product obtained. Thus, when, in the claims, I refer to sugar cane fiber, I intend to cover the employment of such fiber in any form or condition suitable for the application of my method.

It will be understood that various changes may be resorted to in the steps of the process, in the materials, and in the apparatus, without departing from the spirit and scope of my invention; and hence I do not intend to be limited to the details herein set forth except as they may be included in the claims.

What I claim is:

1. A method of treating sugar cane fiber to produce cellulose of high alpha content, which includes, treating the fiber with a dilute sulphurous acid solution containing no base and thereafter treating the fiber with a dilute alkaline solution.

2. A method of treating sugar cane fiber to produce cellulose of high alpha content, which includes, treating the fiber with a dilute sulphurous acid solution of insufficient strength to completely pulp the fiber, and thereafter treating the fiber with an alkaline solution.

3. A method of treating sugar cane fiber to produce cellulose of high alpha content, which includes, treating the fiber with a hot dilute sulphurous acid solution that contains no base and is of insufficient strength to completely pulp the fiber, separating the solution from the fiber, and thereafter treating the fiber with a hot dilute alkaline solution of insufficient strength to completely pulp the original fiber.

4. A method of treating sugar cane fiber to produce cellulose of high alpha content, which includes, treating the fiber under elevated temperature and pressure with a dilute sulphurous acid solution that contains no base and is of insufficient strength to completely pulp the fiber, and thereafter treating the fiber under elevated temperature and pressure with a dilute alkaline solution of insufficient strength to completely pulp the original fiber, the effect of said two treatments being to completely pulp the original fiber.

5. A method of treating sugar cane fiber to produce cellulose of high alpha content, which includes, treating the fiber with a dilute sulphurous acid solution that contains no base and is of about one percent $SO_2$ based on the bone dry weight of the fiber, for a period of a few minutes, at a temperature of approximately 120° to 130° C.; and thereafter treating the fiber with an alkaline solution of about eighteen to twenty-five percent alkali based on the bone dry weight of the fiber, at a temperature of approximately 140° to 170° C.; for a period of approximately one to two hours.

In testimony, that I claim the foregoing as my invention, I have signed my name this 30th day of April, 1928.

JOAQUIN JULIO de la ROZA, Senior.